United States Patent
Smiarowski et al.

(10) Patent No.: US 10,520,635 B2
(45) Date of Patent: Dec. 31, 2019

(54) APPARATUS AND METHOD FOR DETERMINING EARTH'S NEAR-SURFACE PROPERTIES WITH ON-TIME MEASUREMENTS FROM AIRBORNE TIME-DOMAIN ELECTROMAGNETIC DATA

(71) Applicant: CGG SERVICES SAS, Massy (FR)

(72) Inventors: Adam Smiarowski, Toronto (CA); Greg Hodges, Mississauga (CA)

(73) Assignee: CGG SERVICES SAS, Massy (FR)

( * ) Notice: Subject to any disclaimer, the term of this patent is extended or adjusted under 35 U.S.C. 154(b) by 29 days.

(21) Appl. No.: 15/738,685

(22) PCT Filed: Aug. 31, 2016

(86) PCT No.: PCT/IB2016/001334
§ 371 (c)(1),
(2) Date: Dec. 21, 2017

(87) PCT Pub. No.: WO2017/037536
PCT Pub. Date: Mar. 9, 2017

(65) Prior Publication Data
US 2018/0180759 A1    Jun. 28, 2018

Related U.S. Application Data

(60) Provisional application No. 62/213,122, filed on Sep. 2, 2015.

(51) Int. Cl.
*G01V 3/36* (2006.01)
*G01V 3/16* (2006.01)
*G01V 3/165* (2006.01)

(52) U.S. Cl.
CPC ............... *G01V 3/36* (2013.01); *G01V 3/16* (2013.01); *G01V 3/165* (2013.01)

(58) Field of Classification Search
None
See application file for complete search history.

(56) References Cited

U.S. PATENT DOCUMENTS

2015/0234073 A1 * 8/2015 Sorensen ............. G01V 3/08
324/345

FOREIGN PATENT DOCUMENTS

WO    2010022515 A1    3/2010
WO    2014056094 A1    4/2014

OTHER PUBLICATIONS

Christensen, N.B., "Optimized Fast Hankel Transform Filters"; Geophysical Prospecting, vol. 38, Issue 5; Jul. 1990; pp. 545-568.

(Continued)

*Primary Examiner* — Jermele M Hollington
*Assistant Examiner* — Suresh K Rajaputra
(74) *Attorney, Agent, or Firm* — Patent Portfolio Builders PLLC

(57) ABSTRACT

A device and method for calculating electrical properties of a surveyed underground formation. The method includes selecting a waveform having multiple current transition rates; placing a time-domain electromagnetic (TEM) system above the underground formation while generating with a transmitter a transient primary magnetic field during an on-time period and no magnetic field during a following off-time period, due to the waveform; and recording with a receiver magnetic related data generated by the earth as a result of the transient primary magnetic field. The receiver records the magnetic related data during the on-time period using plural on-time gates sampling.

20 Claims, 12 Drawing Sheets

(56) References Cited

OTHER PUBLICATIONS

Lee, T., et al.; "Transient EM response of a large loop," Geophysical Prospecting, vol. 22, Issue 3; Sep. 1974; 430-444.

Morrison, H. F., et al.; "Quantitative interpretation of transient electromagnetic fields over a layered half space." Geophysical Prospecting, vol. 17, No. 1; Mar. 1969; pp. 82-101.

Singh, N. P., et al.; "Electromagnetic response of a large circular loop source on a layered earth: A new computation method." Pure and Applied Geophysics, vol. 162, Issue 1; Jan. 2005; pp. 181-200.

Brian R. Spies, "Depth of investigation in electromagnetic sounding methods", Geophysics, Jul. 1989, pp. 872-888, vol. 54, No. 7.

Changchun Yin et al., "3D animated visualization of EM diffusion for a helicopter EM system", Geophysics, Jan.-Feb. 2007, pp. F1-F7, vol. 72, No. 1.

G.M. Hoversten et al., "Transient fields of a current loop source above a layered earth", Geophysics, Jul. 1982, pp. 1068-1077, vol. 47, No. 7.

Haoping Huang et al., "The differential parameter method for multifrequency airborne resistivity mapping", Geophysics, Jan.-Feb. 1996, pp. 100-109, vol. 61, No. 1.

James E. Reid et al., "Comments on the electromagnetic 'smoke ring' concept", Geophysics, Nov.-Dec. 1998, pp. 1908-1913, vol. 63, No. 6.

James Macnae et al., "Imaging quasi-layered conductive structures by simple processing of transient electromagnetic data", Geophysics, Apr. 1987, pp. 545-554, vol. 52, No. 4.

Misac N. Nabighian, "Quasi-static transient response of a conducting half-space—An approximate representation", Geophysics, Oct. 1979, pp. 1700-1705, vol. 44, No. 10.

International Search Report and Written Opinion, dated Dec. 1, 2016, from corresponding PCT Application No. PCT/IB2016/001334.

Nicklas Skovgaard Nyboe, Improving instrumentation and measuring strategies for the transient electromagnetic method applied in hydrogeophysical investigations, 144 pages, Jan. 27, 2012, Graduate School of Science and Technology/GSST—Ny Munkegade 120—building 1521—local 112-8000 Aarhus C—Denmark.†

\* cited by examiner
† cited by third party

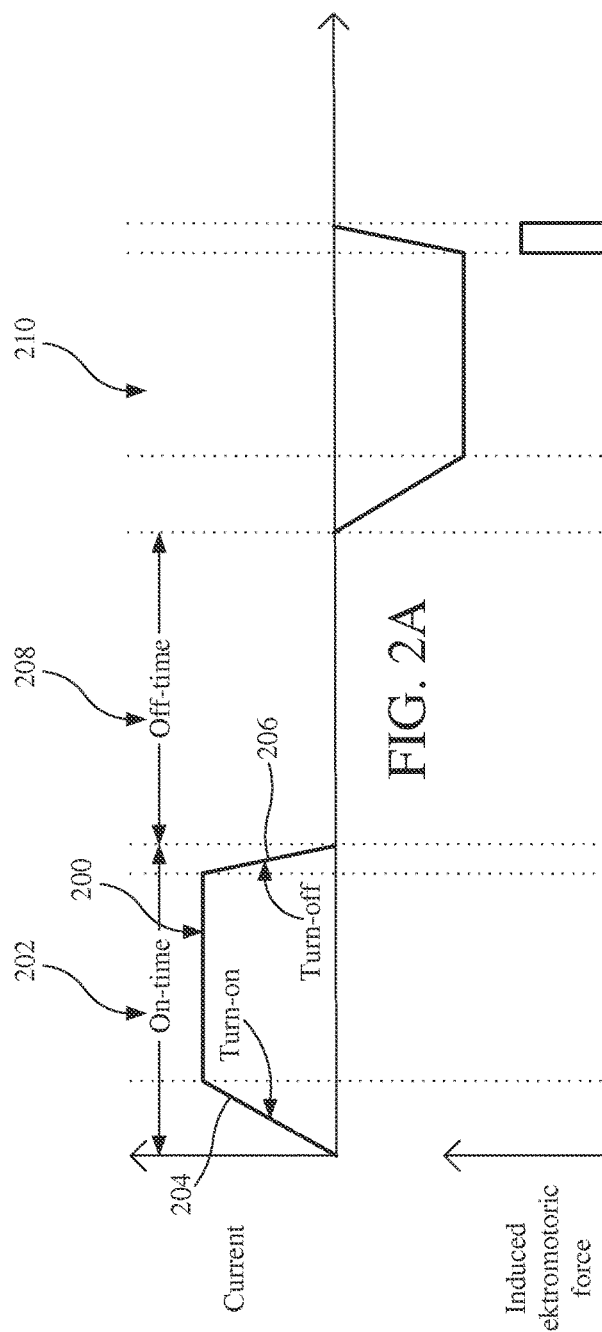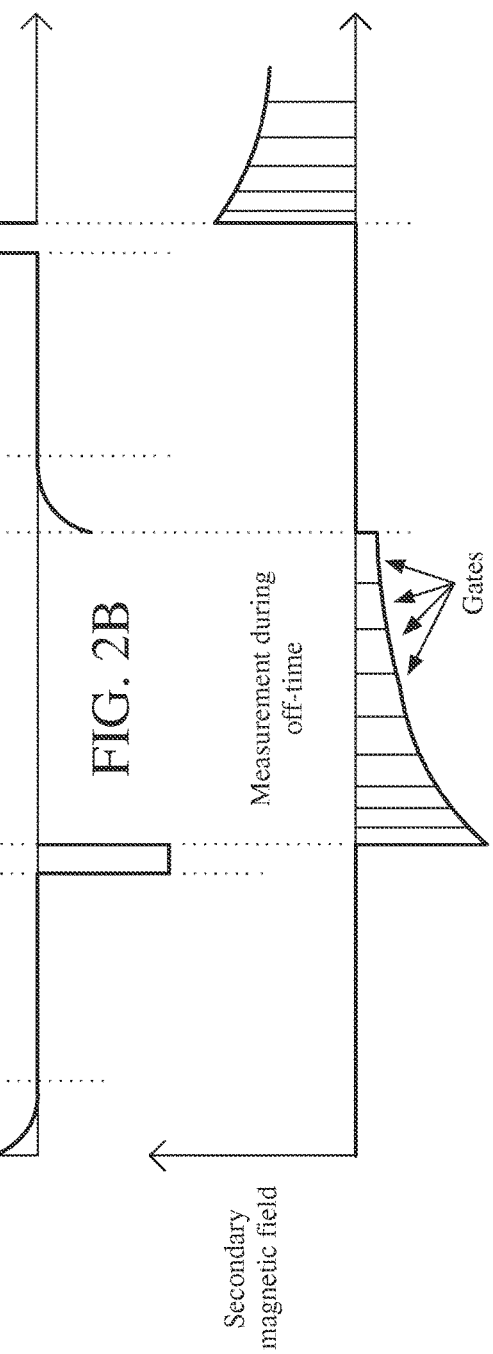

APPARATUS AND METHOD FOR DETERMINING EARTH'S NEAR-SURFACE PROPERTIES WITH ON-TIME MEASUREMENTS FROM AIRBORNE TIME-DOMAIN ELECTROMAGNETIC DATA

CROSS-REFERENCE TO RELATED APPLICATIONS

The present application is a National Stage of PCT Application No. PCT/IB2016/001334, which claims priority and benefit from U.S. Provisional Patent Application No. 62/213,122, filed on Sep. 2, 2015, the entire disclosure of which is incorporated herein by reference.

BACKGROUND

Technical Field

Embodiments of the subject matter disclosed herein generally relate to methods and systems for measuring earth's near-surface properties from time-domain electromagnetic (TEM) data and, more particularly, to mechanisms and techniques for detecting the near-surface properties based on TEM on-time measurements.

Discussion of the Background

Electromagnetic (EM) surveying is a method of geophysical exploration to determine the properties of a portion of the earth's subsurface, information that is especially helpful in the mining industry, the oil and gas industry, as well as having application toward the geotechnical and environmental industries. EM surveys may be based on a controlled source that sends primary EM fields into the earth, which induce eddy currents in the earth. The eddy currents generate a secondary EM field or ground response. By measuring the secondary field with an EM receiver, it is possible to estimate the depth and/or composition of the subsurface features. These features may be associated with a wide range of geologic structure or rock types, including subterranean hydrocarbon deposits and mineral deposits.

For an airborne TEM survey system 100, as illustrated in FIG. 1, an airborne transmitter 102 applies a time-varying current to a coil, which generates a primary time-varying magnetic field 104. Different from the TEM method, a frequency-domain electromagnetic (FDEM) method uses the inductive properties of a continuous primary electromagnetic field to measure the conductivity (reciprocal of resistivity) of the material through which the field passes. Note that the TEM method uses the inductive properties of a transient primary electromagnetic field to measure the ground response or resistivity of the material through which the field passes, generally after the primary field is turned off. Primary time-varying magnetic field 104, when entering the ground 106, according to Faraday's Law, induces an electromotive force 108 (EMF, or potential) and an electric field 110 in the ground. The induced potential causes a current 112 to flow in the ground 106. The current 112 and electric field 110 diffuse (in most geologic situations) laterally outward and vertically downward. Due to the resistive nature of the ground, the current 112 and electric field 110 decay in amplitude. The secondary magnetic field 114 associated with these currents is sensed by a receiver 116 or, the time-variation of the magnetic field is sensed by a receiver 116. Transmitter 102 and receiver 116 may be connected to an aircraft 118 so that a large area of the ground is swept.

In most EM systems, an induction response is the response from a layered earth containing conductive material and is typically defined to have a positive polarity as measured by a vertical coil receiver. For the majority of EM surveys, the secondary magnetic field or its time variation is the desired measurement quantity, i.e., the magnetic field related data. Because the primary field is much larger than the secondary field, it is customary to measure the secondary field when the primary field is off, i.e., during the off-time. In this regard, FIG. 2A shows the current 200 in the transmitter 102 during the on-time period 202. It is noted that the current 200 is constant, with a turn-on phase 204 and a turn-off phase 206. Following the on-time period 202, the current is off, i.e., the off-time period 208 follows. The current 200 is then applied again during a next on-time period 210, but with an inverted sign. FIG. 2B shows the induced EMF force corresponding to the on- and off-times and FIG. 2C indicates that the secondary field measurements take place during the off-time period 208. In one application, the measurements are sampled during plural decay-time-windows as illustrated in FIG. 2C, which are called gates. The gates may be arranged with a logarithmically increasing width to improve the signal/noise ratio.

Approximate data transform algorithms, such as apparent resistivity or conductivity depth transform algorithms, provide a rapid method of imaging airborne electromagnetic data collected during the off-time period 208. Generally, these methods determine a resistivity or conductivity parameter (electrical properties herein) and use the delay time/frequency to estimate the depth at which that parameter should be plotted (see e.g., Huang, H. and Fraser, D., 1996. The differential parameter method for multifrequency airborne resistivity mapping, Geophysics, 61, 1, 100-109). The depth for frequency domain methods is related to the skin-depth of each frequency. Time domain methods have estimated the effective depth through various methods, for example by using image theory for thin sheets (e.g., Macnae, J., & Lamontagne, Y., 1987, imaging quasi-layered conductive structures by simple processing of transient electromagnetic data, *Geophysics,* 52(4), 545-554) or diffusion depth of the electric field in a homogenous half-space (Nabighian, M., 1979, Quasi-static transient response of a conducting half-space—An approximate representation, *Geophysics,* 44, 1700-1705; Spies, B. R., 1989, Depth of investigation in electromagnetic sounding methods, *Geophysics,* 54, 7, 872-888).

The current induced in a homogenous half-space by a step-off time domain electromagnetic (TEM) transmitter (an approximation of which is shown in FIG. 2A) can be visualized as a system of smoke rings propagating downward and outward from the transmitter (Nabighian, 1979). The concept of an expanding smoke ring has been used to illustrate the diffusion of an electric field in a layered earth. Nabighian (1979) explained how a transmitter step-off excitation induces a current system in a homogenous half-space, which diffuses outward and downward from the transmitter. Hoversten and Morrison (1982) (Hoversten, G. M. and H. F. Morrison, 1982, Transient fields of a current loop source above a layered earth, *Geophysics,* 47, 7, 1068-1077) calculated electric field contours from a repetitive square-wave system for various layered earth models, showing that the smoke ring becomes distorted at layer boundaries. Reid and Macnae (1996) (Reid, J. E. and J. C. Macnae, 1998, Comments on the electromagnetic "smoke ring" concept, *Geo-*

*physics*, 63, 6, 1908-1913) examined smoke rings for the frequency-domain case and showed the in-phase and quadrature electric fields. Yin and Hodges (2007) (Yin, C. and G. Hodges, 2007, 3D animated visualization of EM diffusion for a helicopter EM system, *Geophysics*, 72, 1, F1-F7) computed 4-D frequency-domain electric and magnetic fields, showing diffusion in anisotropic media. Yin and Hodges showed that the continuous sine-waveform of frequency domain systems causes alternating positive and negative wave fronts to propagate as the transmitter polarity changes. In the time-domain case, only the ideal step-off waveform has been discussed in the literature and mostly off-time measurements have been collected for data analysis.

Thus, there is a need to develop new methods for processing the airborne TEM data for making use of data collected during the on-time period.

SUMMARY

One or more of the embodiments discussed herein illustrate how to the record magnetic related data, generated by the earth as a result of a transient primary magnetic field, for being able to calculate electrical properties of the earth with a better accuracy.

According to one embodiment, there is a method for calculating electrical properties of a surveyed underground formation. The method includes selecting a waveform having multiple current transition rates; placing a time-domain electromagnetic (TEM) system above the underground formation while generating with a transmitter a transient primary magnetic field during an on-time period and no magnetic field during a following off-time period, due to the waveform; and recording with a receiver magnetic related data generated by the earth as a result of the transient primary magnetic field. The receiver records the magnetic related data during the on-time period using plural on-time gates sampling.

According to another embodiment, there is a time-domain electromagnetic (TEM) system for calculating electrical properties of a surveyed underground formation. The TEM system includes a controller for receiving a waveform having multiple current transition rates; a transmitter for generating a transient primary magnetic field during an on-time period and no magnetic field during a following off-time period, when the waveform is applied to the transmitter; and a receiver for recording magnetic related data generated by the earth as a result of the transient primary magnetic field. The receiver records the magnetic related data during the on-time period using plural on-time gates sampling.

According to still another embodiment, there is a non-transitory computer readable medium including computer executable instructions, wherein the instructions, when executed by a processor, implement instructions for calculating electrical properties of a surveyed underground formation as noted above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 2A-2C illustrate the current, EMF and measured secondary magnetic field (during off-time) for an airborne TEM acquisition system;

DETAILED DESCRIPTION

Figure 1:
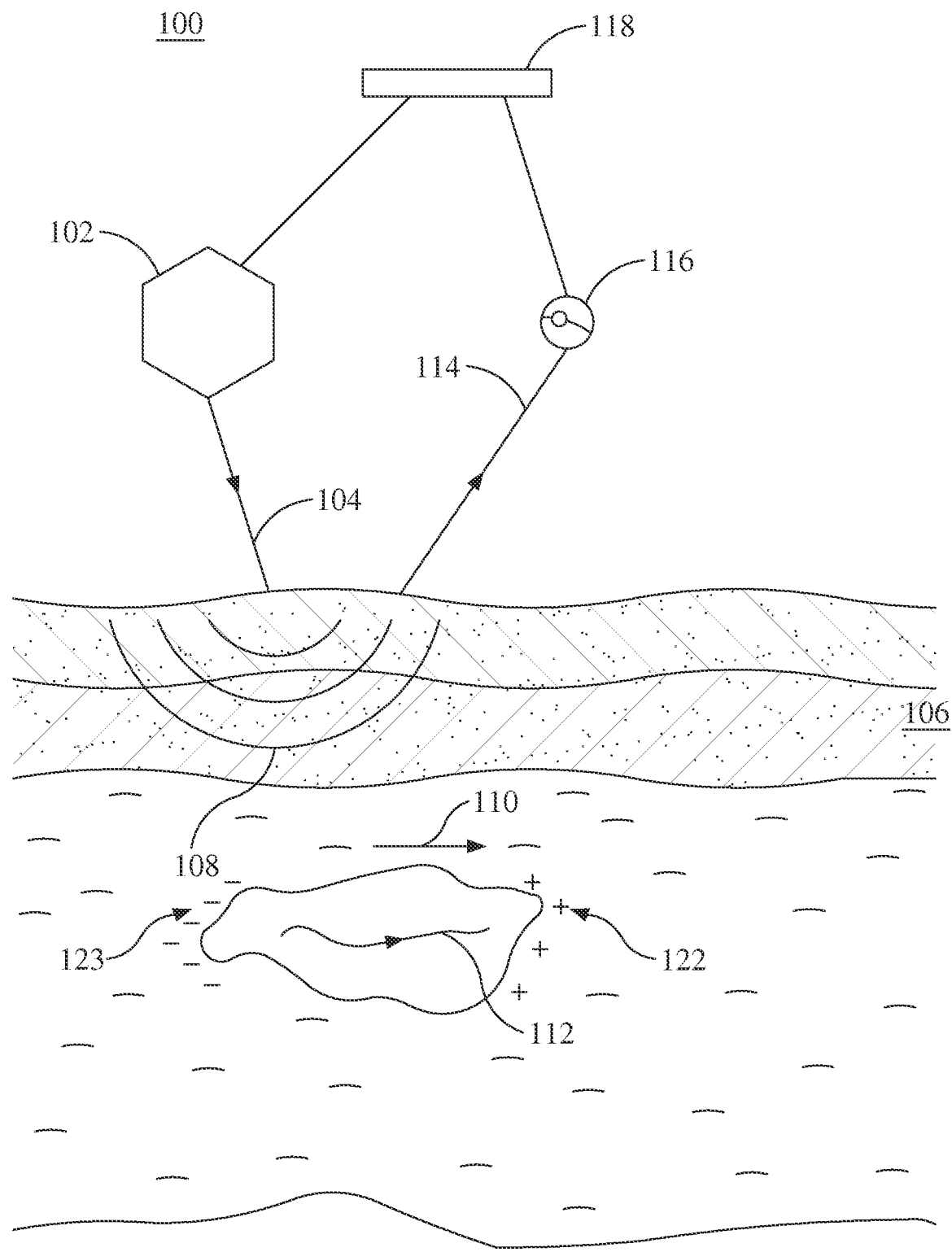
FIG. 1 is a schematic diagram of a TEM acquisition system.

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following, the diffusion pattern for a half-sine waveform is calculated and analyzed. In particular, the current distribution is estimated during the transmitter's on-time period, which appears to be concentrated near-surface compared to the current distribution during the off-time period. Resistivity look-up tables can be generated for both the on-time and the off-time periods by calculating the EM secondary response for a wide range of homogenous half-space resistivity values.

A number of authors have derived the expression to calculate the electric field in a layered earth due to a vertical dipole, including Morrison et al. (1969), (Morrison, H. F., Phillips, R. J., & O'brien, D. P., 1969, Quantitative interpretation of transient electromagnetic fields over a layered half space. *Geophysical prospecting*, 17(1), 82-101), Lee and Lewis (1973) (Lee, T. and R. Lewis, 1973, Transient EM response of a large loop, *Geophysical Prospecting*, 22, 430-444) and Singh and Mogi (2005) (Singh, N. P. and T. Mogi, 2005, Electromagnetic response of a large circular loop source on a layered earth: A new computation method. *Pure and Applied Geophysics*, 162, 181-200).

Following the presentation in Kaufmann and Keller (1983) (Kaufman, A. A. and G. V. Keller, 1983, Frequency and transient soundings, Elsevier, ISBN 0444420320), the frequency-domain electric field E at a location (r,z) in a layered earth is calculated as:

$$E_{\phi 1} = \frac{i\omega\mu}{8\pi} \int_0^\infty \frac{2\lambda}{\lambda + m} e^{-\lambda h} e^{-mz} J_0(\lambda r) d\lambda$$

where $E_{\phi 1}$ is the azimuthally circulating electric field in the topmost layer of the ground, w is the angular frequency in radians, p is magnetic permeability of the layer, h is the transmitter elevation, z is the depth in the layer, r is the horizontal distance from the transmitter, $J_o$ is the Bessel function of order 0 and $\Delta$ is the Hankel transform integration variable. Then, the electric field is transformed into the time-domain using the Fourier transform as described by Christensen (1990) (Christensen, N. B., 1990, Optimized Fast Hankel Transform FILTERS1, *Geophysical Prospecting*, 38(5), 545-568) to obtain the step response.

To obtain the electric field from a half-sine waveform, the electric field is convolved with the time-derivative of the transmitter current I(t) using the expression:

$$E(t) = I(t) * E_{IP} = -\frac{dI(t)}{dt} * E_S,$$

where $E_{IP}$ is the impulse response and $E_S$ is the step-response of the half-space. The current density $J_\phi$ in the earth is calculated using Ohm's Law, $J_\phi) = \sigma E_{s\phi})$, where $\sigma$ is the conductivity of the earth.

Figure 3A:
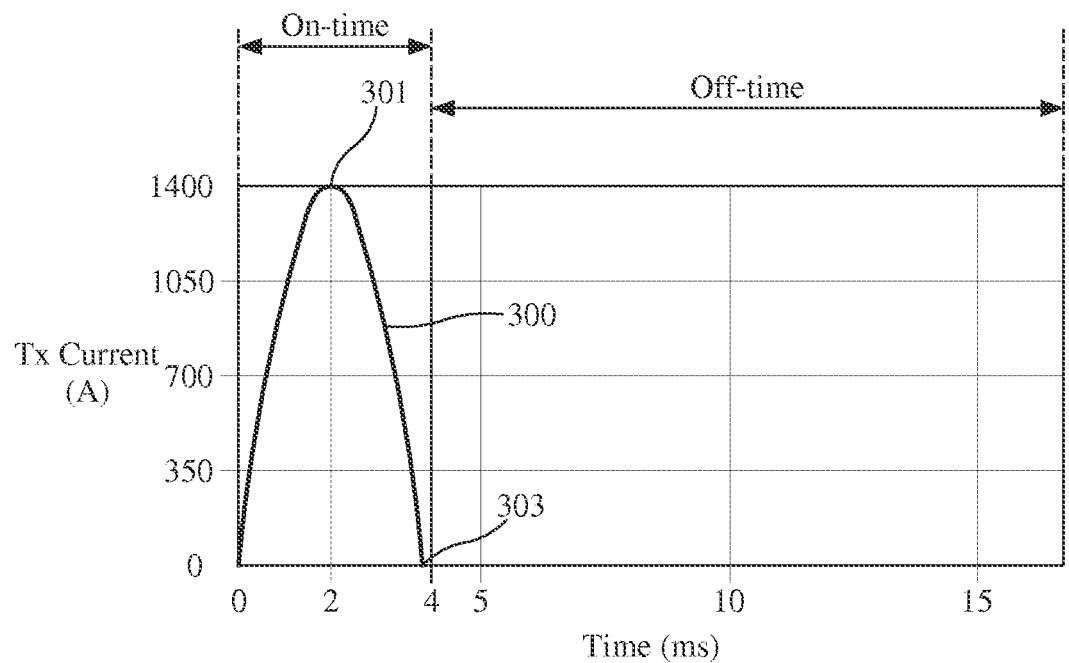
FIG. 3A illustrates a current waveform having multiple different current transition rates and FIG. 3B illustrates a response recorded by a receiver in response to the current waveform of FIG. 3A.
Figure 3B:
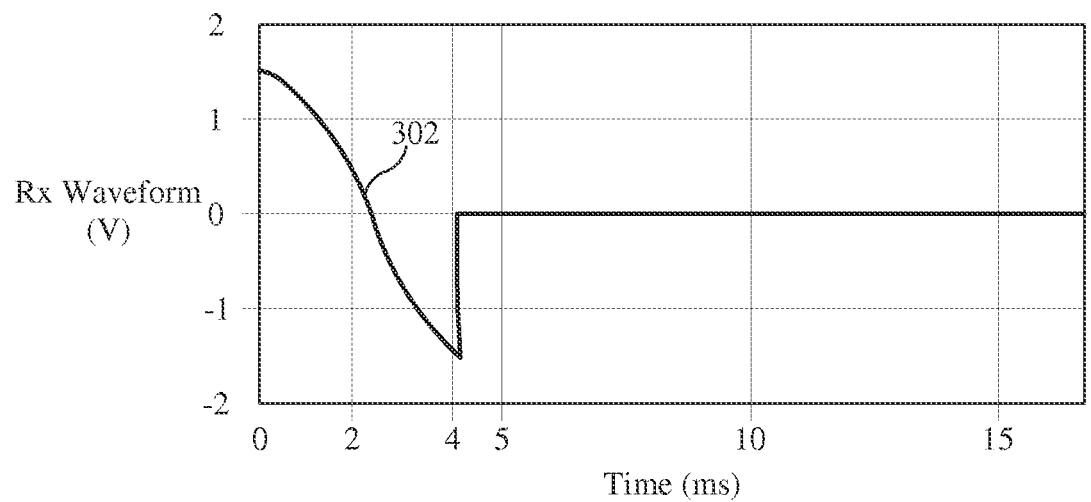
Figure 4A:
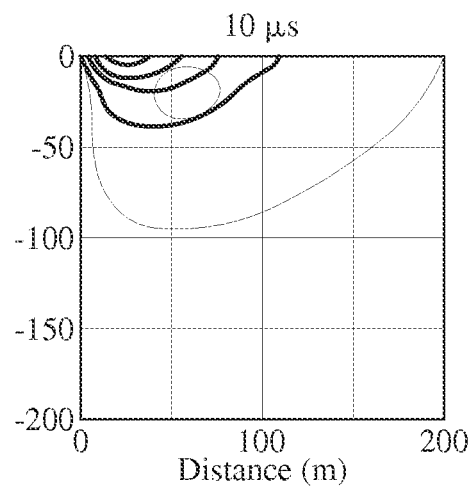
FIGS. 4A-4F illustrate current distributions in near-surface for selected times during the segment of the current waveform of FIG. 3A, where the current is increasing.
Figure 4B:
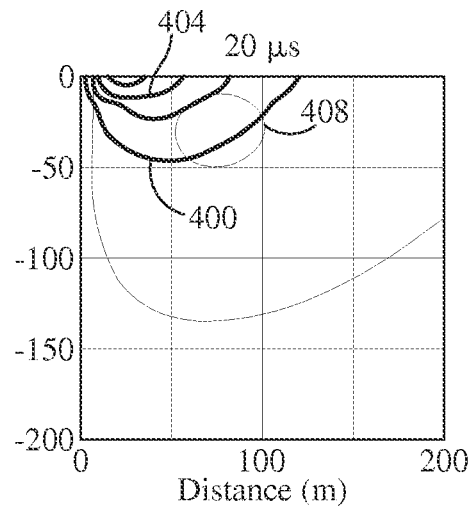
Figure 4C:
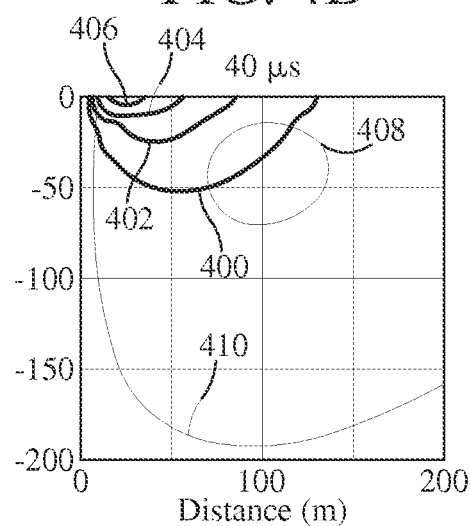
Figure 4D:
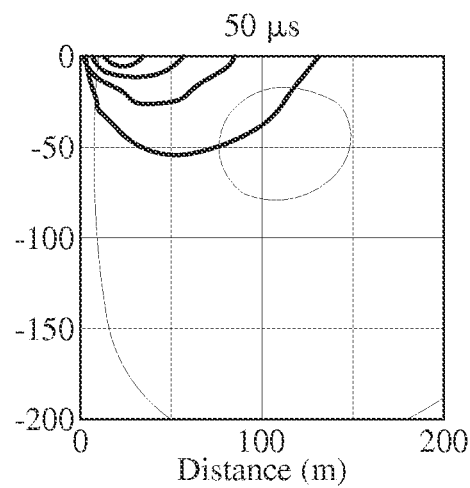
Figure 4E:
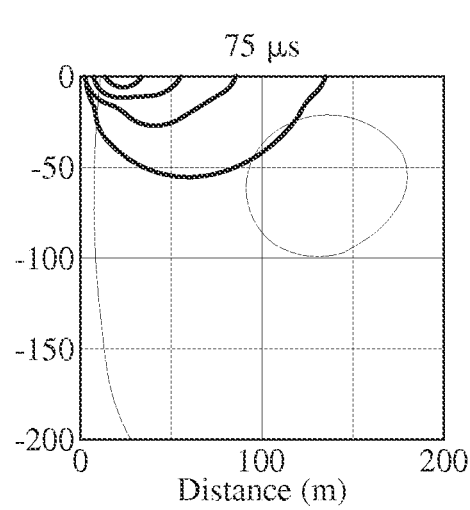
Figure 4F:
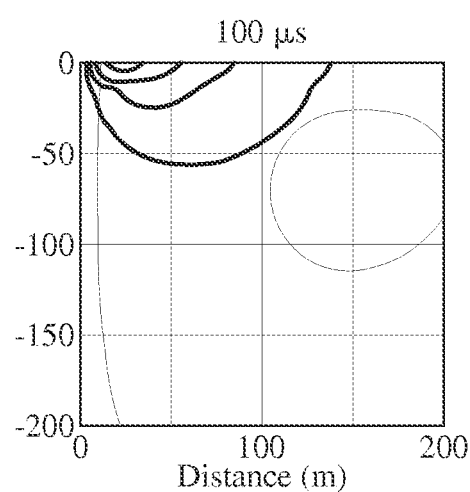
Figure 5A:
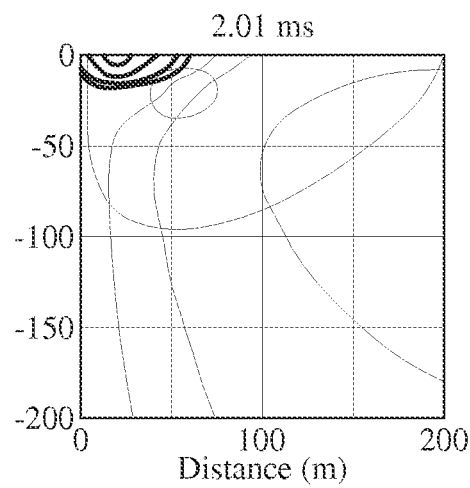
FIGS. 5A-5F illustrate current distributions in near-surface during a portion of the current waveform of FIG. 3A, where the current is decreasing in amplitude.
Figure 5D:
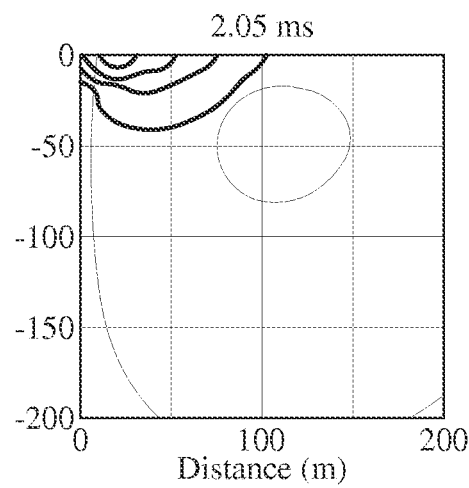
Figure 5B:
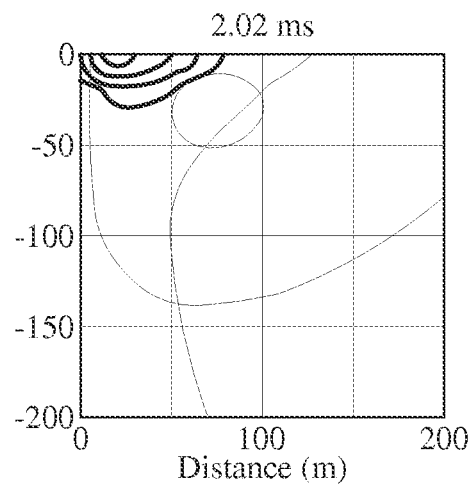
Figure 5E:
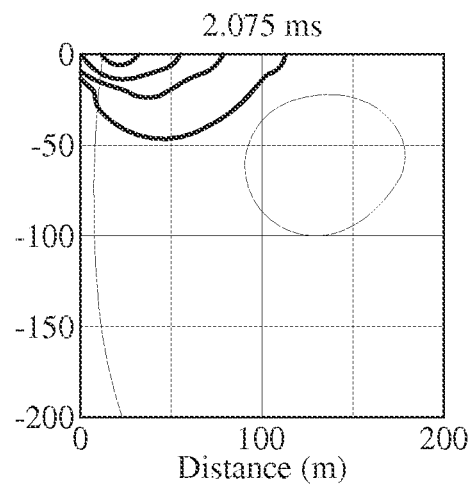
Figure 5C:
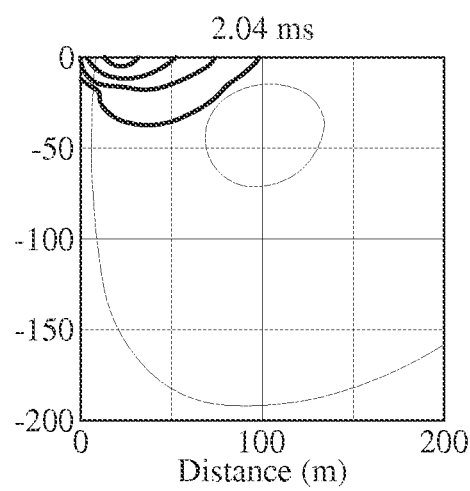
Figure 5F:
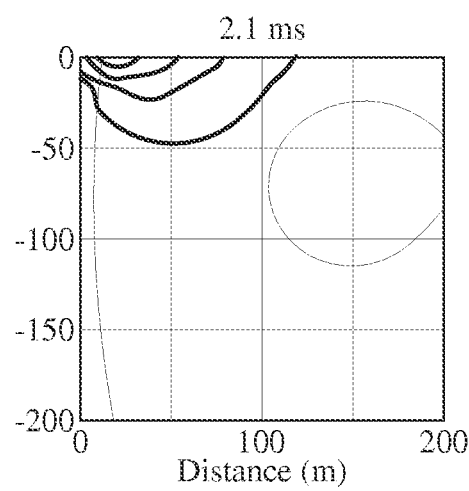
Figure 6A:
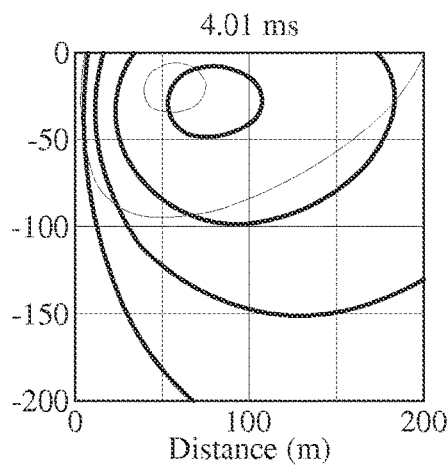
FIGS. 6A-6F illustrate current distributions in near-surface for an off-time period of the current waveform of FIG. 3A.
Figure 6D:
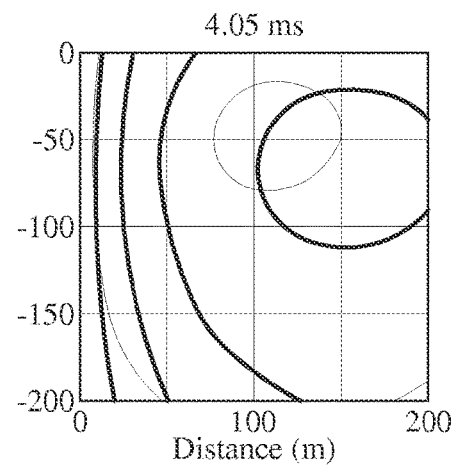
Figure 6B:
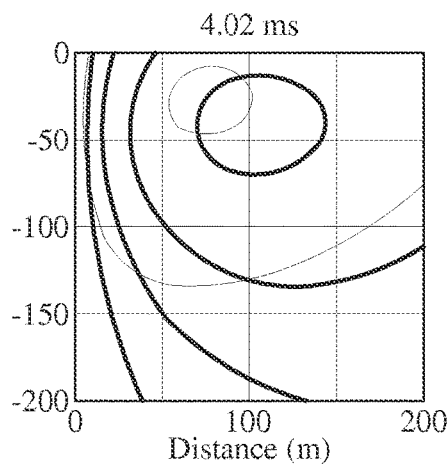
Figure 6E:
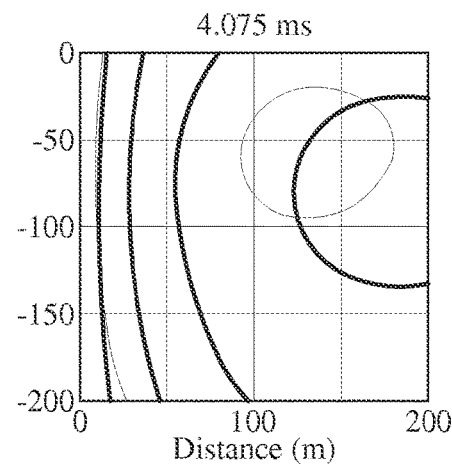
Figure 6C:
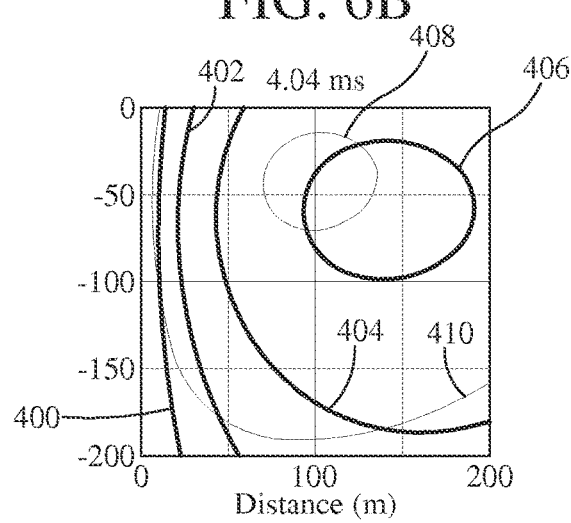
Figure 6F:
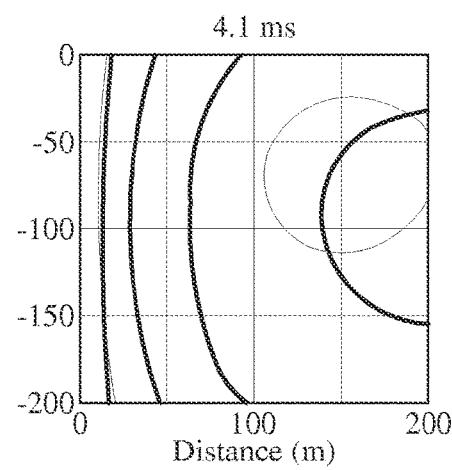

To illustrate the effect of the waveform on the measured data, the following setup has been used. A transmitter was placed 30 m above the surface of the earth and a half-sine waveform 300 has been applied to the transmitter. The sine waveform 300 has a 4 ms pulse width and a current of 1,400 A as illustrated in FIG. 3A. Waveform 300 has a transition point 301 and an end point 303. After end point 303, waveform 300 is zero (during the off-time period). The primary field 302 at the receiver, which measures the time rate of change of the magnetic field, is a half-cosine as shown in FIG. 3B.

The current density induced in a 100 Ωm homogenous half-space, at 1 μs intervals from the start of waveform 300, is calculated and image contours of the current density in the earth are illustrated in FIGS. 4A-F, to provide an animation of the current's diffusion in time. FIGS. 4A-F illustrate the current density normalized by the maximum current density at that time, for a corresponding depth (on the Y axis) and a corresponding distance from the transmitter (on the X axis). The figures show contours 400, 402, 404 and 406 corresponding to 10%, 25%, 50% and 90% of the maximum current density. The figures show the current density at delay times of 10, 20, 40, 50, 75 and 100 μs from the turn-on at time 0 (see FIG. 3A) of the half-sine waveform 300. As shown in FIG. 3A, there are three distinct phases of the primary field induction: induction is positive from 0 to 2 ms, negative from 2 to 4 ms and 0 afterward.

Each FIG. 4A-4F also shows contours 408 and 410 of the normalized current density of a step response (square wave) (i.e., traditional arrangement illustrated in FIGS. 2A-2C) at a same delay time from the start point (zero in FIG. 3A) in the half-sine waveform (i.e., each figure shows step-off current density 408 and 410 at delay times of 10, 20, 40, 50, 75 and 100 μs). Step-off current density contour 408 corresponds to 90% and current density contour 410 corresponds to 10% of the maximum current density.

FIGS. 4A-4F show the up-ramp phase of the half-sine waveform 300 (time interval between 0 and 2 ms), FIGS. 5A-5F show the down-ramp interval (from 2 to 4 ms) and FIGS. 6A-6F show the current density during the off-time.

The off-time current density is most similar to the step-off studies in the literature. As shown in FIGS. 6A-6F, the current density resembles a smoke-ring with the current maximum diffusing downward and outward. At early times, the current from the half-sine has diffused considerably further than the perfect step-off waveform; the 10% contour 410 of the step-off is at the same depth as the 50% contour 404 of the half-sine. For later times, the difference in depth is less significant.

FIGS. 4A-4F show that at a short time after the turn-on of the half-sine waveform 300, the current is concentrated near-surface (the induced current density has opposite sign to the EM induction). Notice that during the up-ramp, the current system is little changed from 10 μs to 100 μs; even just before 2 ms, the 10% contour is shallower than 100 m (not shown). The current distribution 10 μs after the start of the pulse (FIGS. 4A-4F) is much more concentrated near-surface than at 10 μs after the end of the pulse in FIG. 6A. This means that in this moderately conductive half-space, during the up-ramp, all the current that diffuses away is immediately replaced at surface by the continuing primary induction. The situation is different in more conductive half-spaces, where the current diffusion is much slower. This example is meant to compare the current distribution of the on-time and off-time. Different waveforms will result in different exact results, but the conclusion that the current distribution in the ground during the on-time is concentrated relatively closer to the surface than during the off-time will hold true.

FIGS. 5A-5F show the current density at selected times from the mid-point 301 of the waveform 300 toward the end point 303 of the waveform (the down-ramp). At the mid-point 301 of the waveform 300, the primary excitation is 0 (as shown in FIG. 3B, the receiver waveform). When the induction is zero, no new current is being generated at the surface. A short time later (10 μs), new current is generated at the surface, and the current induced from the up-ramp is still visible (with opposite sign as denoted by thinner lines). The total induced current at surface has smaller amplitude than the up-ramp case because the primary induction is smaller and the residual current from the up-ramp must be overcome.

Compared to the step-off case (i.e., current densities 408 and 410), the current is concentrated at the surface during the on-time of the half-sine waveform 300. This is because the continuing induction replaces the current at the surface that diffuses away. This analysis suggests that on-time measurements are much more relevant for near-surface layers than off-time measurements, even for systems that have very fast turn-off ramps.

Figure 7:
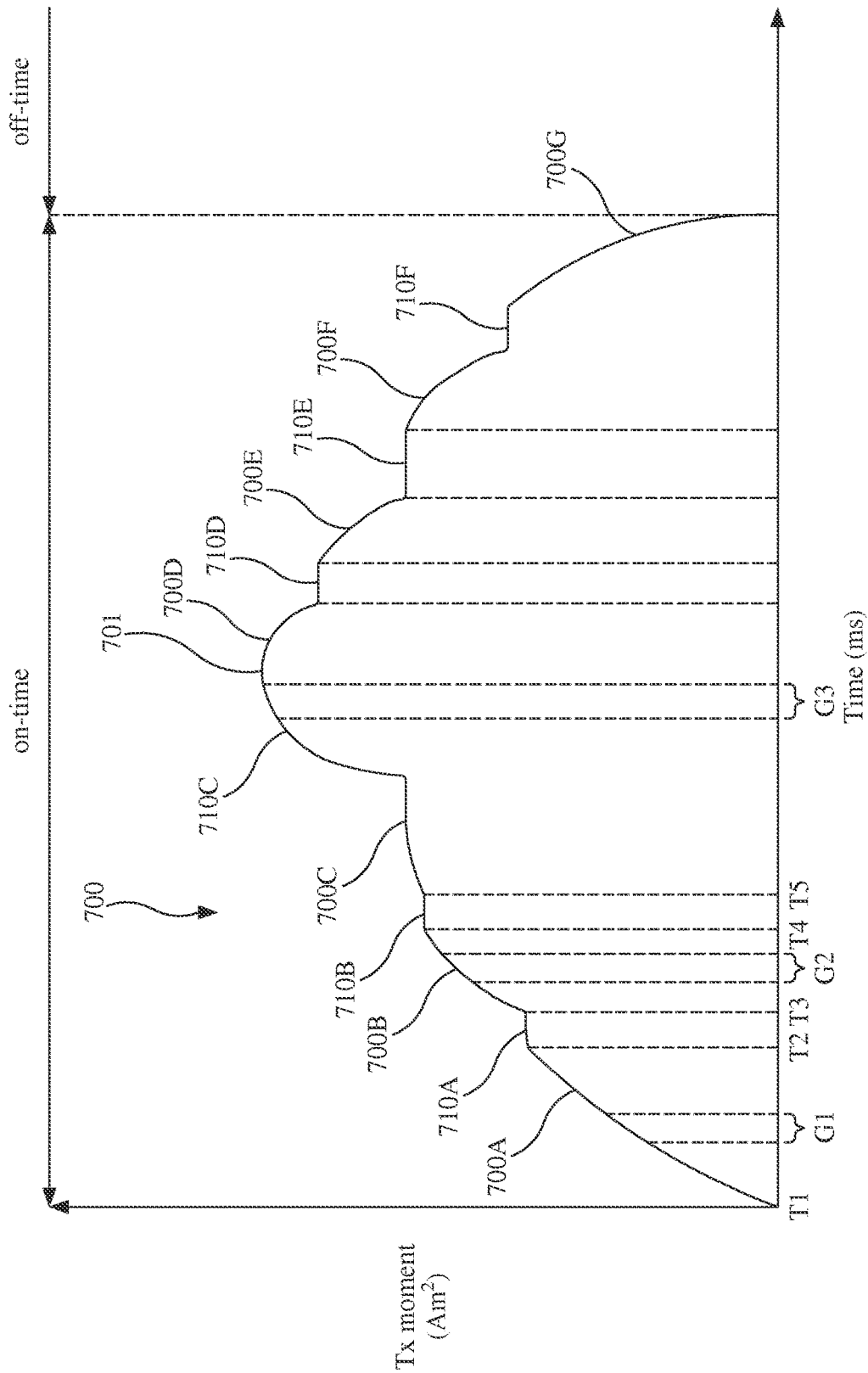
FIG. 7 illustrates a waveform having multiple different current transition rates and areas where the rate of change is varying discontinuously.
Figure 8:
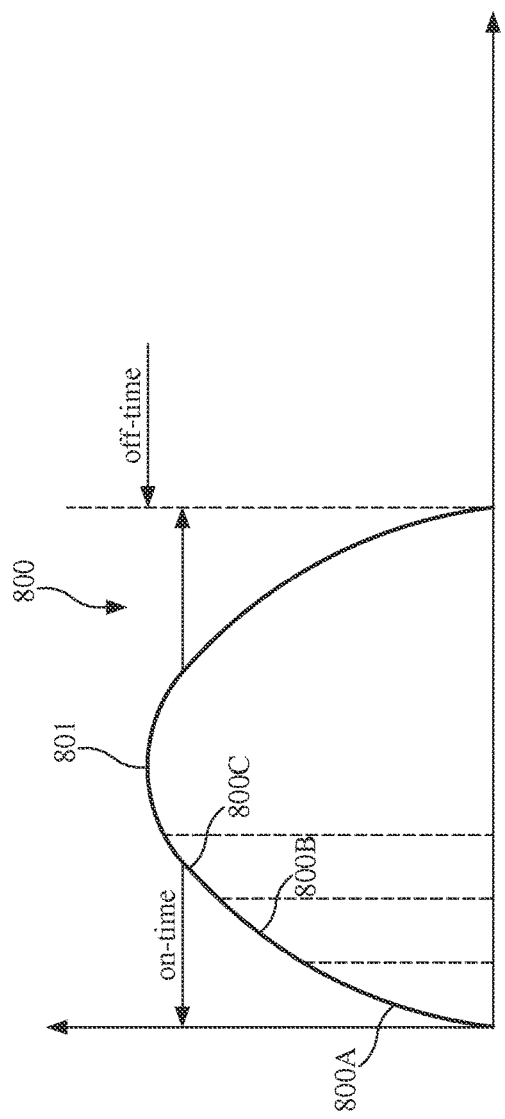
FIG. 8 illustrates a waveform having multiple different current transition rates and a continuously varying rate of change.
Figure 9:
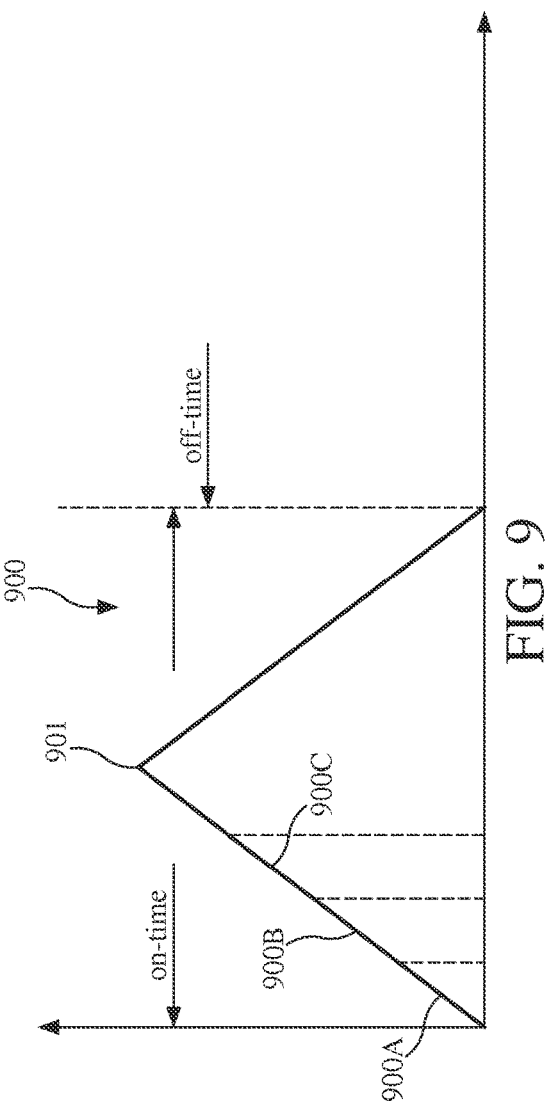
FIG. 9 illustrates a waveform having multiple identical current transition rates.

According to an embodiment, there is a method for collecting TEM data with a TEM system for estimating near-surface electrical properties by measuring the electromagnetic signal from the earth during the on-time of the transmitter current waveform. According to this embodiment, the waveform employs multiple different current transition rates and varying transition rates. FIG. 7 shows a waveform 700 having multiple different current transitions and multiple different current transition rate of changes (e.g., current rate of change for portion G1 is different from the current rate of change for portion G2) 700A-700G. FIG. 7 also shows areas where the rate of change is varying discontinuously, e.g., at times T2, T3, T4 or T5. Note that in one embodiment, the multiple current transition rate of changes may be identical. For example, the waveform may be constructed to have multiple slopes, that is, sections with different slopes, or start-stops (where the slope is one value, then switched to zero, then sloped again) because it is desirable, from a signal-to-noise perspective, to measure the response from the ground after large changes in the slope of the current. In another embodiment, some of the multiple current transition rate of changes are the same while the others are different. A current transition is any portion of a waveform for which the amplitude of the current changes in time, and a current transition rate is considered in the following to be the rate of change in time for any portion of the waveform 700. For example, portions 710A-710F in FIG. 7 are portions of the waveform 700 that do not change in time, i.e., they are constant in time or, in other words, there are no current transitions and no current transition rates. Thus, portions 710A-710F do not represent current transition rates. Further, one current transition rate 700A may be different from another current transition rate 700B, if their slopes (or rates) are not the same. Thus, FIG. 7 shows multiple different current transitions having multiple different current transition rates 700-700G. FIG. 8 shows a waveform 800 having multiple different current transition rates 800A-800C that continuously vary. Note that in FIG. 7, because of the constant current portions 710A-710F, the multiple current transition rates 700A-700G do not vary in a continuous way (i.e., there is a jump between current transition rates 700A and 700B). In one embodiment, there are different slopes for different portions of the waveform (note that FIG. 7 is not at scale and thus it may appear that FIG. 7 shows the slopes of the different portions to be the same). FIG. 9 shows multiple identical current transition rates 900A-C that continuously vary except for the transition point 901. Those skilled in the art would know that other waveforms may be used as long as they show two or more current transition rates.

The TEM system is configured to measure near-surface conductivity or resistivity using many on-time gates sampling throughout the on-time of the waveform. For example, as illustrated in FIG. 7, on-time gates G1 to G3 (only three gates are shown for simplicity, but the number of gates is 5 or higher) are selected during current transitions. This selection ensures that the measurements capture most or all of the shallow information content generated during the on-time of the waveform.

Because waveform 700 in FIG. 7 or waveform 800 in FIG. 8 has multiple different current transition rates, the electromotive force (EMF) varies at different points during the on-time of the TEM system. The varying EMF results in different current distributions in the ground and the system having a different near-surface sensitivity at different points during the on-time period. However, it is possible to also have multiple identical current transition rates as illustrated in FIG. 9, which will not produce results as rich as those corresponding to waveforms 700 or 800. There is also an advantage to varying the amount of time at which the current is varying at a particular rate, allowing control of the diffusion of induced current into the ground and hence the distribution of current in the ground.

Because waveform 800 uses a continuously varying slope (one example is a half-sine waveform), the EMF force is continuously varying during the on-time of the TEM system. The continuously varying EMF results in different current distributions in the ground and the system having different near-surface sensitivity at different points in the on-time.

Figure 10:
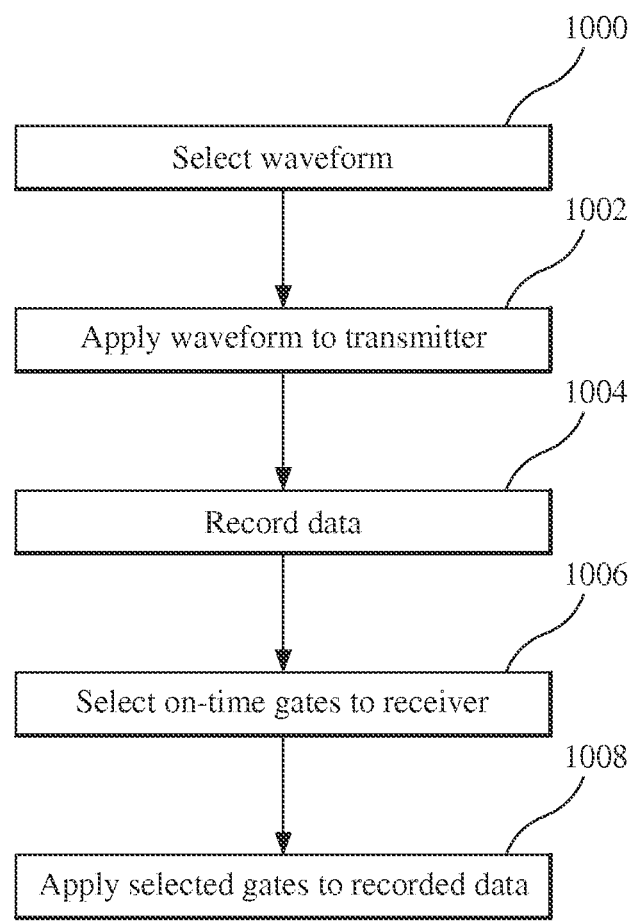
FIG. 10 is a flowchart of a method for recording magnetic related data with a TEM system driven with a waveform having multiple current transition rates.
Figure 11:
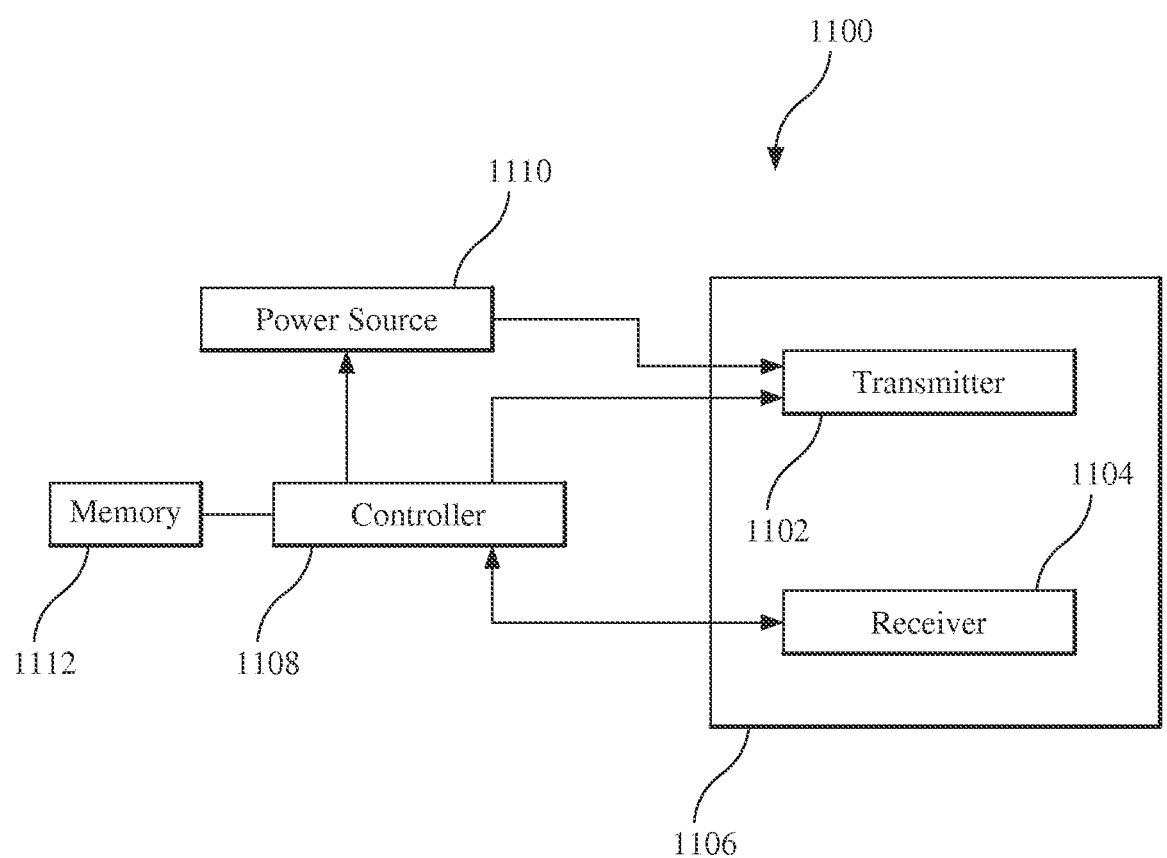
FIG. 11 illustrates a TEM system.

Returning to the method noted above, which is illustrated in FIG. 10, a waveform to be applied to the transmitter of the TEM device is selected in step 1000. This selection may be performed by the controller itself, depending on the conditions of the survey, or it may be performed by the survey's operator and entered into the controller through a dedicated interface. TEM device 1100 is shown in FIG. 11 as including a transmitter 1102 and a receiver 1104 located on a carrier element 1106. Carrier element 1106 may include multiple parts and it may be attached to an aircraft (not shown). A controller 1108 controls the application of the selected waveform to the transmitter. TEM device 1100 may also have a power source 1110, which provides the current to the transmitter. Power source 1110 output may be controlled by controller 1108. Controller 1108 may include a storage element 1112, for storing the data collected by the receiver 1104. The selected waveform (see examples in FIGS. 7-9) has two or more current transition rates. In one application, the waveform has multiple different current transition rates. In another application, the waveform has multiple different current transition rates and continuously varying transition rates. The waveform has an on-time period and an off-time period. During the off-time period, as previously discussed, no current is applied to the transmitter.

In step 1002, the selected waveform is applied by the controller 1108 to the transmitter 1102. The primary magnetic field is thus generated by the transmitter, eddy currents are induced in the earth, and secondary magnetic fields are generated by the eddy currents. The controller is configured in step 1004 to record the data, i.e., magnetic related data due to the eddy currents. In step 1006, the controller is configured to select (or calculate or establish or determine) on-time gates for the receiver 1104, for recording the secondary magnetic fields, or their variations. The number of on-time gates can be between 5 and 10,000. For example, for the waveform 300 shown in FIG. 3A, the waveform's on-time and off-time periods last together for 16.667 ms, with the on-time being 4 ms and the off-time being 12 ms. 2,000 measurements may be made during the 16 ms, which are grouped into 30 channels. In one application, the data is gated differently, i.e., channel 1 could be data points 14-20 or could be data points 10-100. This is an illustrative example and those skilled in the art would understand that many more measurements may be made. This is a function of the data acquisition system used. For example, it is possible to sample at 122 kHz, 2 MHz or even higher rates. Four channels may be during the on-time and the remaining 26 channels may be during the off-time. Note that other configurations may be possible. In one application, the width of the selected on-time gates varies, e.g., increasing with time. In step 1008, the selected gates are applied to the data collected by the receiver. The data is typically magnetic field information, e.g., the value of the magnetic field or variations of the magnetic field, or value of the components of the magnetic field, etc. Note that this method does not exclude recording the data during the off-time. The method discussed above indicates that more sensitivity for the near-surface electrical properties of the earth are achieved by using on-time measurements for a waveform that has multiple current transition rates instead of using off-time measurements.

In one embodiment, the TEM system has many on-time gates with relatively dense samplings during current transitions (where the primary field amplitude changes). During the current transitions, the current's distribution in the ground is relatively near-surface. During the on-time, the current distribution at different times is shallower than at corresponding times after the termination of the transmitter current. By sampling temporally close to these transition points, measurements made by the TEM system will be relatively more sensitive to electrical properties of the near-surface material. The distribution of the current in the ground determines the depth-sensitivity of the associated magnetic field readings at the receiver. The transition points can be visualized by calculating the time-derivative of the current waveform. The first time derivative shows the primary EMF. The second time-derivative shows segments where the primary EMF is changing rapidly and may indicate where gates should be densely placed.

By understanding the current distribution in the ground, a conductivity-depth algorithm may be created to determine a conductivity section of the earth from the recorded magnetic field information. For example, the equivalent-filament method can be used to approximate a depth of investigation. The equivalent-filament model depth can be estimated from knowledge of how the currents diffuse into the earth. Alternatively, a time-weighted integration of the time-domain diffusion depth or penetration depth can be used to determine the depth of investigation. Other approaches or embodiments are possible and will be readily apparent to those skilled in the art having the benefit of this disclosure.

Figure 12:
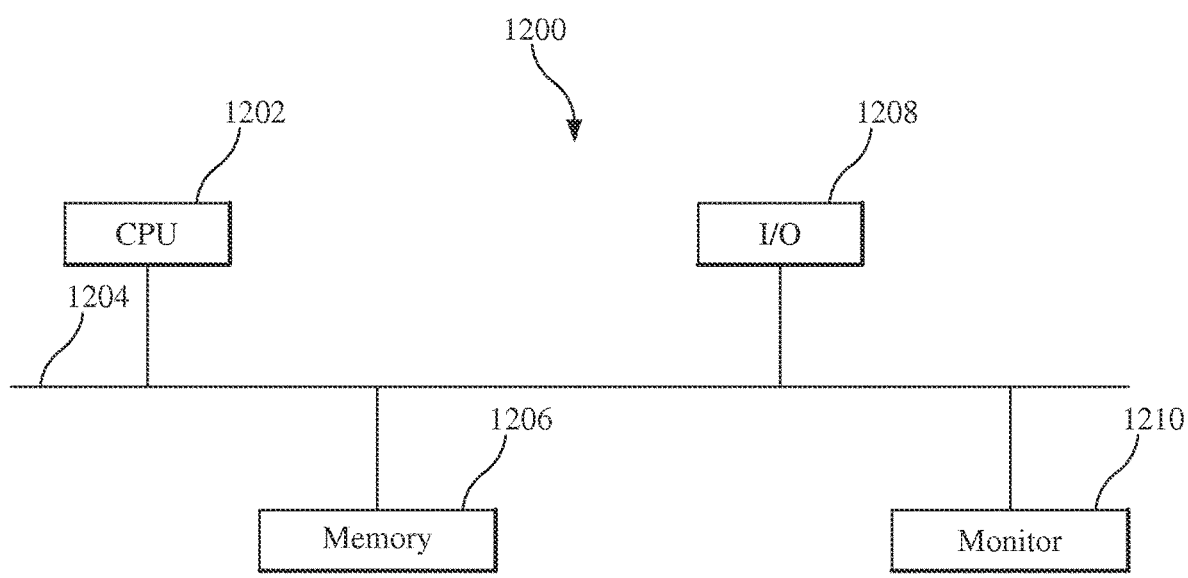
FIG. 12 is a schematic illustration of a controller.

As also will be appreciated by one skilled in the art, the embodiments discussed above may be embodied in a controller 1200 as illustrated in FIG. 12. Controller 1200 (which may correspond to controller 1108 in FIG. 11) includes a processor 1202 that is connected through a bus 1204 to a storage device 1206. Controller 1200 may also include an input/output interface 1208 through which data can be exchanged with the processor and/or storage device. For example, a keyboard, mouse or other device may be connected to the input/output interface 1208 to send commands to the processor and/or to collect data stored in storage device or to provide data necessary to the processor. The processor may be used to process, for example, the signals collected during the survey. Results of this or another algorithm may be visualized on a screen 1210. For example, the electrical properties of the earth measured as noted in the method described in FIG. 11 may be used to generate an image of the surveyed subsurface.

Figure 13:
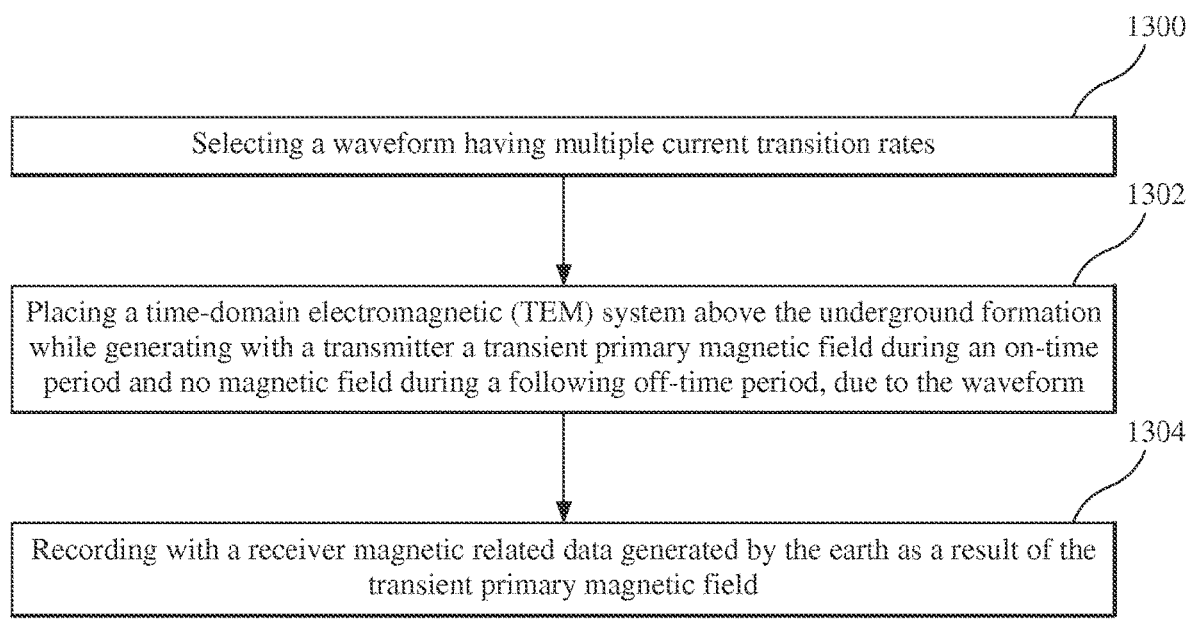
FIG. 13 is a flowchart of a method for recording magnetic related data during an on-time period of a TEM system.

According to an embodiment illustrated in FIG. 13, there is a method for calculating electrical properties of a surveyed underground formation. The method includes a step 1300 of selecting a waveform having multiple different current transition rates, a step 1302 of placing (e.g., flying or fixedly attaching to the ground) a TEM system above the underground formation while generating with a transmitter a transient primary magnetic field during an on-time period and no magnetic field during a following off-time period, due to the waveform, and a step 1304 of recording with a receiver magnetic related data generated by the earth as a result of the transient primary magnetic field. The receiver records the magnetic related data during the on-time period using plural on-time gates sampling. In one application, the waveform has continuously varying current transition rates. In another application, the waveform has multiple different current transitions. In still another application, the waveform is part of a sine function. In one application, the waveform has a continuously varying slope. The on-time gates may have a width that varies in time. For example, it is possible that the width of the on-time gates increases in time. The method may also include a step of recording with the receiver the magnetic related data during the off-time period, and/or a step of generating an image of the surveyed underground formation based on the recorded magnetic related data. The off-time period is followed by another on-time period. There are numerous methods used by those skilled in the art to calculate electrical properties from magnetic related data. These methods include, but are not limited to, using transforms based on electrical skin depth or electromagnetic diffusion depth, transforms using image theory, and data inversions.

The methods discussed above may be implemented in a wireless communication device or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. Furthermore, it is anticipated that the shape of various components may be different when reduced to practice, for example. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a method and device for determining electrical properties of a surveyed subsurface. These properties may be related to conductivity, resistance, etc. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating electrical properties of a surveyed underground formation, the method comprising:
 selecting a waveform having multiple current transition rates;
 placing a time-domain electromagnetic (TEM) system above the underground formation while generating with a transmitter a transient primary magnetic field during an on-time period and no magnetic field during a following off-time period, due to the waveform; and
 recording with a receiver magnetic related data generated by the earth as a result of the transient primary magnetic field,
 wherein the receiver records the magnetic related data during the on-time period using plural on-time gates sampling.

2. The method of claim 1, wherein the waveform has continuously varying current transition rates.

3. The method of claim 1, wherein the waveform has multiple different current transition rates.

4. The method of claim 1, wherein the gates are placed in time to more densely sample the magnetic related data near changes in a slope of the multiple different current transitions.

5. The method of claim 1, wherein the waveform is part of a sine function.

6. The method of claim 1, wherein the waveform has a continuously varying slope.

7. The method of claim 1, wherein the on-time gates have a width that varies in time.

8. The method of claim 7, wherein the width of the on-time gates increases in time.

9. The method of claim 1, further comprising:
 recording with the receiver the magnetic related data during the off-time period.

10. The method of claim 1, wherein the off-time period is followed by another on-time period.

11. The method of claim 1, further comprising:
 generating an image of the surveyed underground formation based on the recorded magnetic related data.

12. A time-domain electromagnetic (TEM) system for calculating electrical properties of a surveyed underground formation, the TEM system comprising:
 a controller for receiving a waveform having multiple current transition rates;
 a transmitter for generating a transient primary magnetic field during an on-time period and no magnetic field during a following off-time period, when the waveform is applied to the transmitter; and
 a receiver for recording magnetic related data generated by the earth as a result of the transient primary magnetic field,
 wherein the receiver records the magnetic related data during the on-time period using plural on-time gates sampling.

13. The TEM system of claim 12, wherein the waveform has continuously varying current transition rates.

14. The TEM system of claim 12, wherein the waveform has multiple different current transition rates.

15. The TEM system of claim 12, wherein the waveform is part of a sine function.

16. The TEM system of claim 12, wherein the waveform has a continuously varying slope.

17. The TEM system of claim 12, wherein the on-time gates have a width that varies in time.

18. The TEM system of claim 12, wherein the receiver also records the magnetic related data during the off-time period.

19. The TEM system of claim 12, wherein the controller is further configured to generate an image of the surveyed underground formation based on the recorded magnetic related data.

20. A non-transitory computer readable medium including computer executable instructions, wherein the instructions, when executed by a processor, implement instructions for calculating electrical properties of a surveyed underground formation, the instructions comprising:
 selecting a waveform having multiple current transition rates;
 instructing a time-domain electromagnetic (TEM) system to generate, with a transmitter, a transient primary magnetic field during an on-time period and no magnetic field during a following off-time period, due to the waveform; and
 recording with a receiver magnetic related data generated by the earth as a result of the transient primary magnetic field,
 wherein the receiver records the magnetic related data during the on-time period using plural on-time gates sampling.

* * * * *